June 22, 1948.  B. C. DAY ET AL  2,443,895
BEVEL GEAR HOLDING FIXTURE
Filed Dec. 20, 1943  4 Sheets-Sheet 1
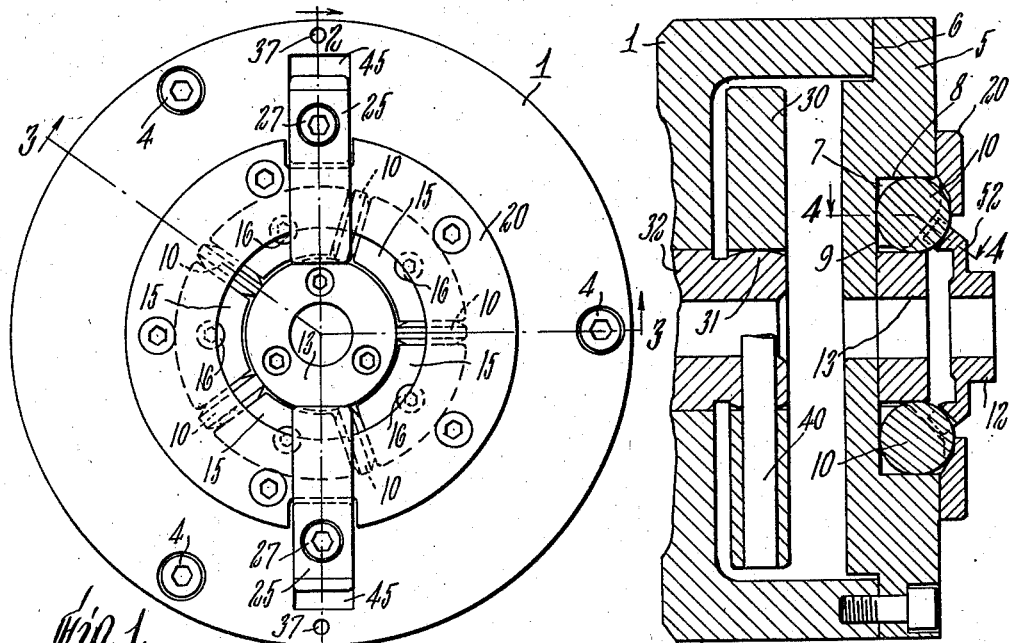
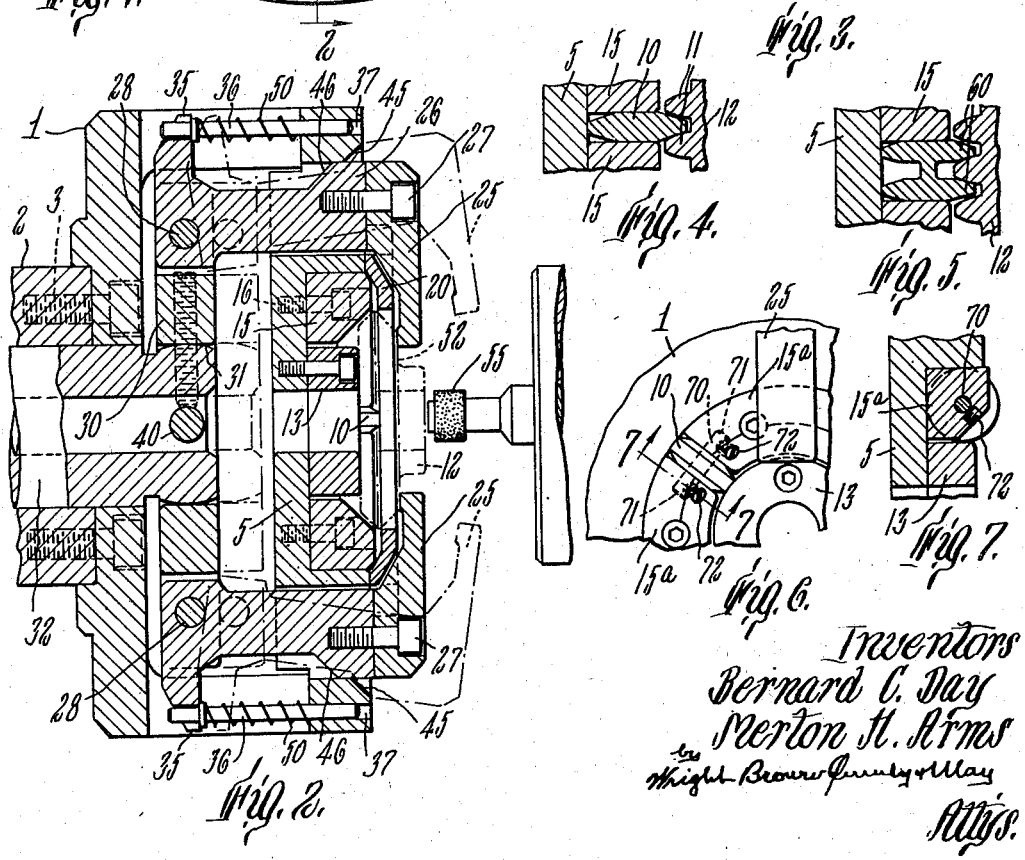
Inventors
Bernard C. Day
Merton H. Arms

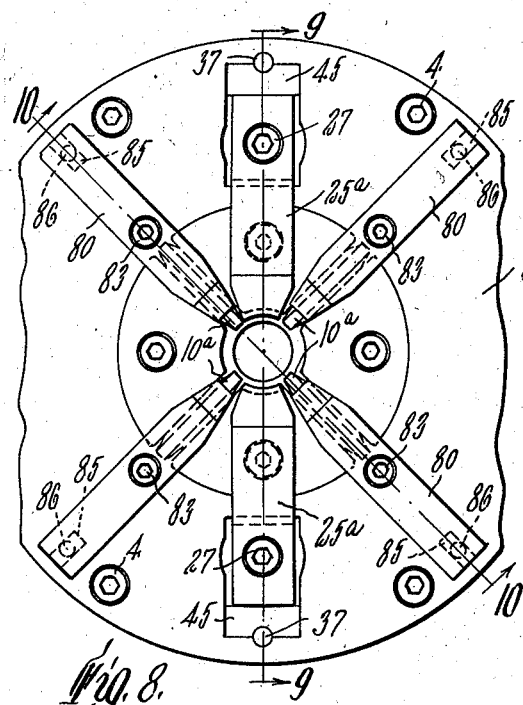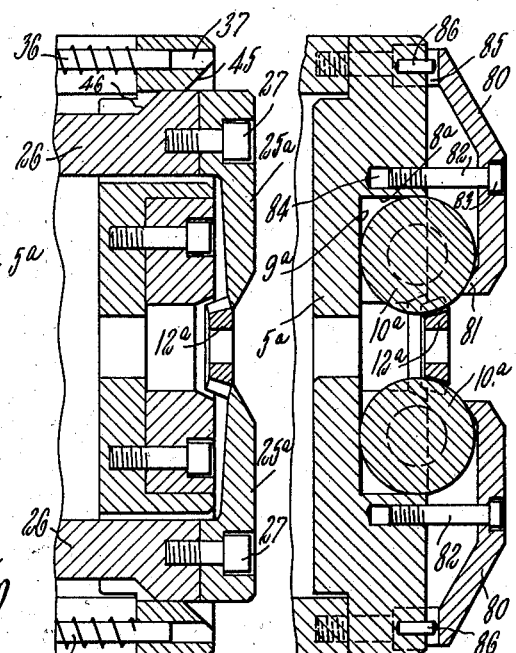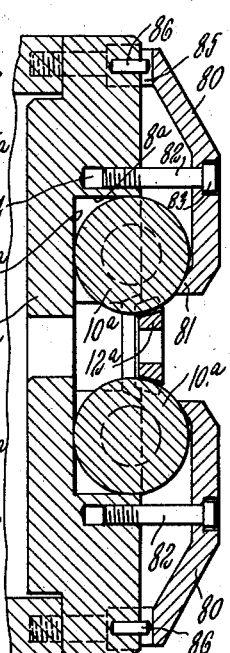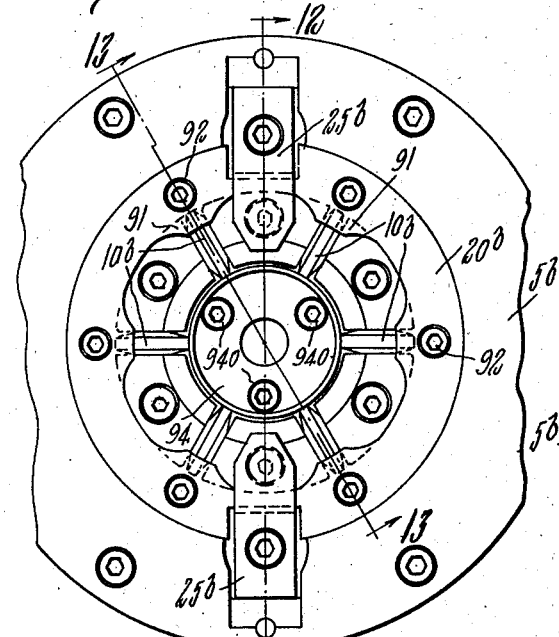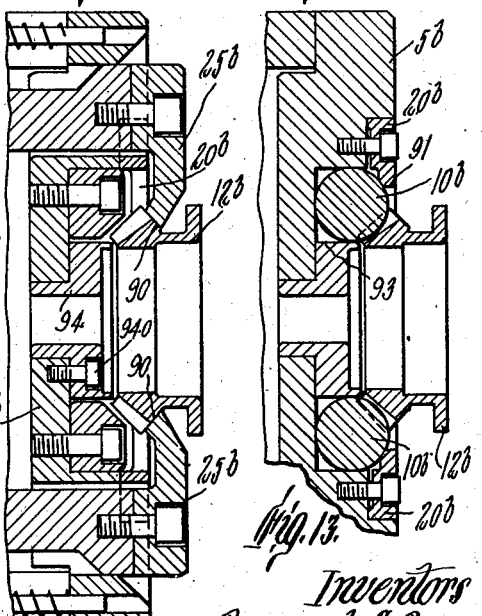

June 22, 1948.                B. C. DAY ET AL                2,443,895
                         BEVEL GEAR HOLDING FIXTURE
Filed Dec. 20, 1943                                    4 Sheets-Sheet 4
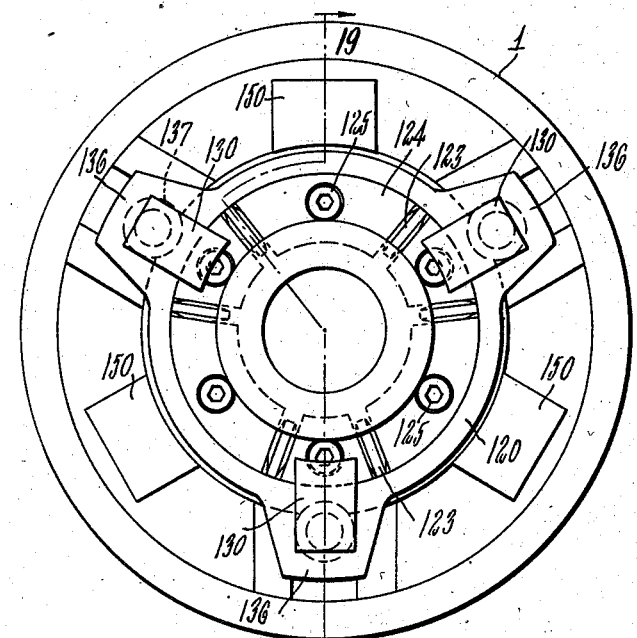
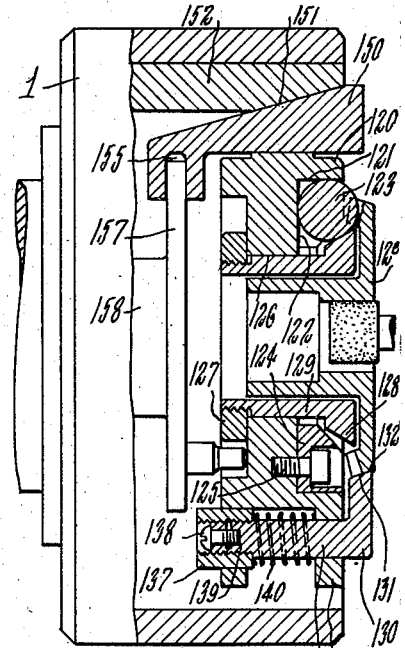
Inventors
Bernard C. Day
Merton H. Arms Patented June 22, 1948

2,443,895

UNITED STATES PATENT OFFICE 2,443,895

BEVEL GEAR HOLDING FIXTURE

Bernard C. Day and Merton H. Arms, Springfield, Vt., assignors to Bryant Chucking Grinder Company, Springfield, Vt., a corporation of Vermont Application December 20, 1943, Serial No. 514,910

11 Claims. (Cl. 279—1)

This invention relates to fixtures for holding bevel gears and has for an object to support the gear so that the axis of its hub bore when completed is concentric with its pitch cone. It may be clamped in this position, if desired, and the fixture used as a chuck to hold the gear while machining operations are performed thereon concentric with the pitch cone, or the gear may be merely supported, instead of clamped, for convenience in gaging, or for other purposes where clamping of the gear is not necessary or desirable.

One important object is to so support the gear that it may be inserted from the front, particularly where the fixture is to be used in connection with a chuck, as this permits ready loading and unloading of the gear while using chucks of standard forms.

In accordance with this invention the gear is located by the use of a plurality of separate elements which are formed to engage between angularly related locating surfaces and the gear teeth in predetermined relation to the pitch cone, together with spacers by which these elements are held in predetermined accurately spaced relation angularly about the gear.

For a more complete understanding of this invention, reference may be had to the accompanying drawings in which Figure 1 is a front elevation of a chuck embodying the invention.

Figures 2 and 3 are sectional views on lines 2—2 and 3—3, respectively, of Figure 1 and showing a gear in position therein.

Figure 4 is a detail sectional view on line 4—4 of Figure 3.

Figure 5 is a view similar to Figure 4, but illustrating a modification.

Figure 6 is a fragmentary view similar to a portion of Figure 1, but showing a modification.

Figure 7 is a detail sectional view on line 7—7 of Figure 6.

Figure 8 is a view similar to a portion of Figure 1, but showing a further modification.

Figures 9 and 10 are sectional views on lines 9—9 and 10—10, respectively, of Figure 8 and showing a gear in position.

Figure 11 is a view similar to Figure 1, but showing a still further modification.

Figures 12 and 13 are detail sectional views on lines 12—12 and 13—13, respectively, of Figure 11 and showing a gear in position in the chuck.

Figure 14:
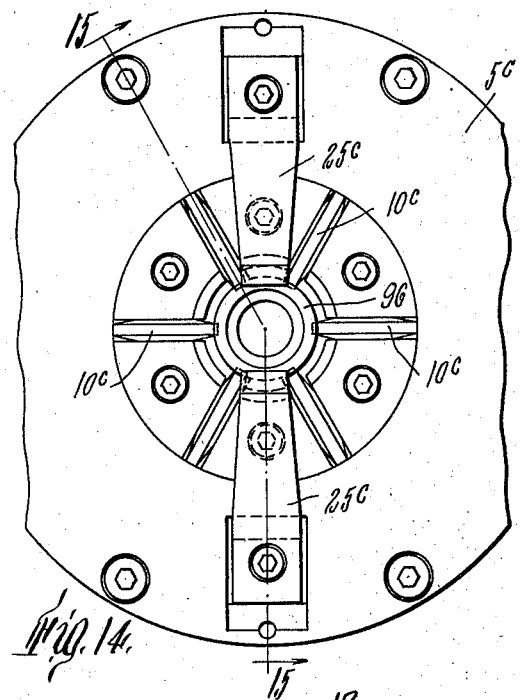
Figure 16:
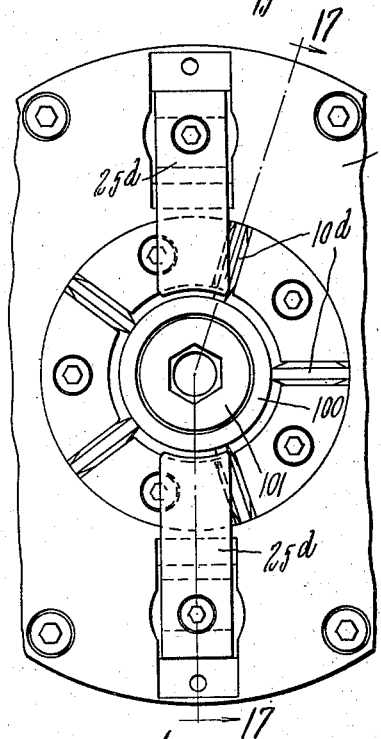

Figures 14 and 16 are fragmentary views similar to a portion of Figure 1, but illustrating a different embodiment of the invention.

Figure 15:
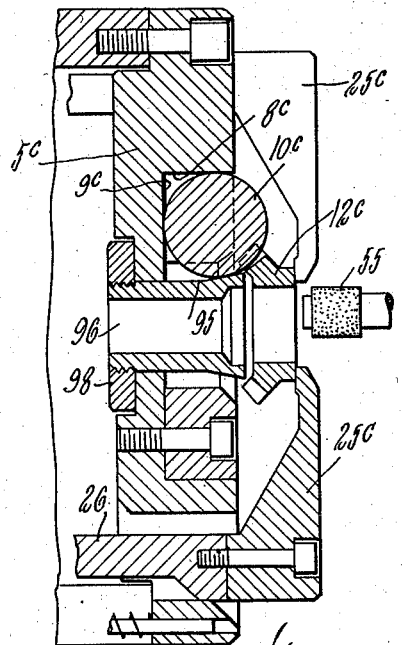
Figure 17:
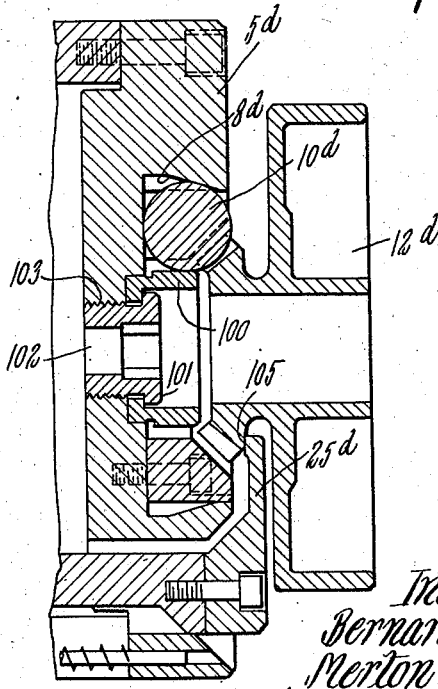

Figures 15 and 17 are sectional views on the correspondingly numbered section lines of Figures 14 and 16, respectively, and showing a gear in position.

Figure 18 is a view also similar to Figure 1, but showing still another embodiment of the invention.

Figure 19 is a view partly in side elevation and partly in section on line 19—19 of Figure 18 and showing a gear in position and a grinding wheel operating on the bore of the gear.

Figure 20 is a side elevation of the chuck shown in Figures 18 and 19 partly broken away and in section but with the gear holder reversed end for end.

Figure 21 is a sectional view of a gear holding fixture adapted for gaging the gear, the gaging plate being shown in elevation.

Referring first to the construction shown in Figures 1 to 4, inclusive, at 1 is shown a chuck body which may have its rear face formed to engage with a standard spindle nose at 2 and to be attached thereto as by the Allen screws 3. The chuck body 1 has fixed to its outer face, as by Allen screws 4, a circular plate 5. The rear face of this plate 5 is recessed about its margin to form an annular face 6 which may bear against the outer edge of the chuck body 1. Its forward face is shown as provided with an annular groove 7, the outer cylindrical and bottom axially perpendicular faces 8 and 9 of which form angularly disposed annular locating faces against which may be engaged a plurality of gear locating and engaging elements 10. As shown, five such elements 10 are employed, though more or less might be employed as desired, it being essential, however, that at least three be employed for stable support of the gear.

Each of these locating elements 10 is shown in the form of a disk having its side faces adjacent to its periphery tapered, as shown best in Figure 4, or otherwise suitably shaped, to engage between and against the side faces of adjacent teeth 11 of a bevel gear 12 which is to be held by the chuck. These disk elements as so shaped engage the bevel gear teeth as the teeth of a mating gear would do, so that service conditions are substantially duplicated and the machining of various gear faces may be correctly related for such conditions. A central ring member 13 secured against the forward face 9 of the plate 5 and inwardly of the locating elements 10 holds these elements outwardly against the locating face 8, this face and the face 9 being carefully machined and ground for accurate positioning of the locating elements 10. Between these locating elements are positioned segmental spacing members 15 which may be secured in position as by the Allen screws 16. These spacers 15 preferably position the locating elements 10 rigidly and accurately around the central axis of the chuck at as nearly equal angular distance as the number of elements used and the number of gear teeth will permit. The locating elements 10 are held in contact with the locating faces 8 and 9 of the plate 5, as by means of a ring 20, the smaller diameter portion of which extends over and engages against the forward faces of the locating elements 10, as shown best in Figure 3. The gear 12 is then clamped in position with the elements 10 engaging the peripheries or working surfaces of its teeth in determined relation to the pitch cone of the gear, and for this purpose a pair of clamping fingers 25 have been shown. These clamping fingers, which may be specially formed for each type of work piece, are shown as secured to the outer ends of L-shaped arms 26 as by Allen screws 27. These L-shaped arms 26 are fulcrumed on the pivots 28 in slots cut in the periphery of a ring 30, within the central opening of which engages the rounded head 31 of a clamp actuating sleeve 32. Each arm 26 has a lateral extension 35 slotted for the reception of a guide pin 36 slidable through a perforation 37 in the face plate 5. The ring 30 is rockably mounted on a pin 40 so that when the sleeve 32 is moved axially, the ring 30 may adjust itself automatically slightly, as will later appear.

The face plate 5 is provided with slots through which the arms 26 project and adjacent to the forward face of the plate 5 it is provided with beveled faces 45 for cooperation with oppositely beveled faces 46 on the arms 26, the arrangement being such that when the sleeve 32 is in its forward position, shown in dotted lines in Figure 2, the forward ends of the arms 26 and with them the fingers 25, may be swung outwardly, this being accomplished by the action of coil springs 50 surrounding the pins 36 and tending to push the pins and portions 35 of jaws 26 rearwardly, rocking the fingers 25 about their pivots 28 out of contact with the outer face of the gear 12. On retraction of the sleeve 32 to the full line position of Figure 2, the beveled faces 45 and 46 crowd the arms 26 toward each other and bring the forward ends of the fingers 25 into engagement with the face 52 of the gear 12 and clamp it firmly against the locating elements 10 as shown in Figure 2. The gear is thus clamped in position where its central bore may be trued, as by a grinding wheel 55 shown in Figure 2, in exact coaxial relation with the pitch cone of the gear, in predetermined relation to which the elements 10 engage the gear teeth.

The rocking provided for the ring 30 about the pin 40 is parallel to the axes of the pivots 28 for the arms 26 and permits the pressure exerted by the two fingers 25 against the gear 12 to be automatically equalized. Instead of engaging between the teeth of the gear, the locating elements may be formed to engage on opposite faces of a single tooth, as shown in Figure 5. In this case instead of forming the locating elements as single disks, they are formed double, or with a pair of spaced peripheral portions 60 formed to engage on opposite sides of a single tooth of the gear. Since the axial length of each of these elements is greater than that of the single disk elements such as are shown in Figure 4, the spacers 15 will be correspondingly shorter when the double element is employed.

In some cases it may be undesirable to employ the ring 20 to retain the locating elements in position because such a ring covers up a substantial arc of the periphery of each locating element. In such a case, each of the locating elements may be so formed as to be held in position by the spacers between them. Such a construction is shown, for example, in Figures 6 and 7 where each of the locating elements is provided with an axial shaft extension or trunnion 70 which may extend into suitable sockets 71 in the ends of the adjacent spacing elements 15a where they may be secured, if desired, as by set screws 72.

In Figures 8, 9 and 10, a different arrangement of locating disk retainers is illustrated, particularly adapted for holding a gear having less room for receiving clamping elements than the gear shown in Figure 3. The gear 12a shown in these figures is held in position by a pair of clamp fingers 25a secured to the forward ends of the arms 26 in place of the fingers 25 shown in Figures 1 and 2. The fingers 25a project over the gear 12a at the teeth portions. The locating elements 10a, as shown in Figure 10, are of considerably larger diameter relative to other parts of the fixture than the elements 10 shown in Figures 1 to 3 and the central ring 13 shown in Figure 3 is omitted. The locating elements 10a are clamped in position by four clamping fingers 80 in place of the clamp ring 20 of Figures 1 to 3. These fingers 80 are positioned in pairs between the work clamping fingers 25a and each is arranged radial to the axis of the fixture. Each has its inner end 81 formed to engage a locating element 10a inwardly of its diametrical center so as to produce an outward component of pressure pressing against the locating surfaces 8a and 9a. Each is held in place by a screw 82 having its Allen head 83 seated in a socket in the outer face of the finger and having its inner end threaded into a socket 84 in the outer plate 5a. The outer end of each finger has a slot 85 into which projects a locating pin 86 projecting outwardly from the forward face of the plate 5a.

In Figures 11, 12 and 13, still another clamping arrangement is shown in which the two fingers 25b engage the beveled outer face 90 of the gear 12b, the locating elements 10b being held in position by inwardly extending projections 91 of a retaining ring 20b and the enlarged diameter periphery 93 of a bushing member 94 fixed in position by screws 94a. This ring 20b is secured within an annular recess in the outer face of the face plate 5b as by means of the screws 92.

In Figures 14 and 15 the locating elements 10c are pressed against their locating faces 8c and 9c by engagement with the tapered outer face 95 of a sleeve 96 extending through the central perforation of the face plate 5c, this sleeve being urged into clamping relation with the locating elements 10c as by tightening a nut 98 threaded on the rear extremity of the sleeve 96 in a recess in the back face of the plate 5c. The gear 12c is clamped in position by the fingers 25c engaging its outer end.

In Figures 16 and 17, the outer locating face 8d is inwardly beveled and the locating elements 10d are held in position between this face 8d and the outer face of a sleeve 100 held in position by the head 101 of a second sleeve 102 threaded into a threaded central perforation 103 of the face plate 5d. The forward end of the sleeve 102 has a polygonal bore for the reception of a bar wrench by which it may be rotated. The gear 12d is held in place by clamping fingers 25d engaging with the annular shoulder 105 of the work piece 12d.

In each of these constructions described, it will be noted that the gear may be placed or removed from the forward face of the fixture and that various arrangements for holding the locating elements and the gear itself may be employed, depending upon the particular configurations of the gear or the parts of it which it is desired to machine. It will be evident that many other arrangements to suit other configurations and operations may be employed as desired in any particular case.

In Figures 18 to 20, an arrangement is illustrated in which the gear is supported within a cage, which may be inserted either end out in a suitable chuck, so that machining operations on either or both ends are facilitated and with a single mounting of the gear in the cage. The cage comprises a tubular body member 120 having at one face a recess defining angularly related locating faces 121 and 122 for the reception of the locating disk elements 123 which may be spaced apart angularly as by the segmental spacers 124 positioned therebetween and secured to the body member 120 as by the screws 125. The locating disks are shown as secured against these locating faces, as by means of the externally tapered extremity 128 of the locking sleeve 129, which extends through the central bore 126 of the body member and has threaded thereon the nut 127, this being a somewhat similar mounting for the locating elements to that illustrated in Figure 15, though it should be evident that other means of securing these locating elements within the cage, such as are illustrated in other figures of the drawing, may be employed with the cage. As shown the gear 12e is held with its teeth in engagement with the locating elements 123 as by these clamping fingers 130, each having an inner beveled end 131 engaging the complementally beveled face 132 of the work piece, the shanks 135 of the clamping fingers extending rearwardly through webs 136 at one face of the member 120 and being threaded into nuts 137 at their free ends. These ends 137 may be secured in adjusted positions as by means of screws 138 extending through extremities of the shanks 135 partly severed therefrom and threaded into sockets 139 therein. By the tightening of these screws 138, the end portions of the shanks may be deformed to tighten the nuts 137 in position. Coil springs 140 surrounding these shanks and reacting between the inner faces of the nuts 137 and the webs 136 act to force the fingers 130 into clamping position under yieldable pressure. The cage with the gear thus clamped therein may be inserted either end out in a chuck between wedge-shaped jaws 150 slidably engaging oppositely tapered walls 151 of a sleeve 152 positioned within the chuck body 1. The inner ends of the wedges 150 may have inwardly turned bifurcated portions 155 between which may be engaged an outwardly extending flange 157 of an actuating sleeve or rod 158, by the retraction of which the wedges 151 may be forced inwardly into clamping engagement with the outer periphery of the cage body 120. This arrangement leaves the central bore of the gear 12e accessible for a grinding or other machining operations, as indicated in Figures 19 and 20.

In Figure 21 an arrangement is illustrated wherein the gear is merely supported, no clamping means being shown, the supporting being done by means of the locating disks, either single disks, as shown in Figure 4, or double disks, as shown in Figure 5, which are spaced apart angularly by the segmental spacers 160 and clamped against the annular locating faces 8 and 9 as by the central externally tapered sleeve 162 threaded into the central bore of a support 163. This support 163 is suitably mounted on a block 164 which may rest upon a surface plate 165, the axis of the pitch cone of the gear being accurately perpendicular to the ground face of the surface plate. On this surface plate may be supported, as by the standards 166 and 167, the gaging mechanisms 168 and 169. As shown the gaging mechanism 168 may be used to gage the top end face of the gear 12f, while the gage 169 may be employed to gage the interior bore of the gear. As shown each of the gaging mechanisms includes a feeler 170 movable relative to a supporting block 171 slidable over the surface of the surface plate into and out of operative relation to the gear, and operatively related to a position indicator 172 showing variations in the positions of the feeler with reference to the supporting block.

In all constructions described it will be noted that the locating annular faces by which the locating disk elements are supported, are coaxial with the central bore of the fixture and therefore coaxial with the pitch cone of the gear, either supported or clamped. It will be noted further that the locating disk elements are accurately and fixedly spaced angularly. As the teeth of bevel gears are now formed with great accuracy such an arrangement, which does not permit the supporting elements to vary their angular relationship, provides for great accuracy in the supporting of the gear.

From the foregoing description of certain embodiments of this invention it will be evident to those skilled in the art that various other changes and modifications may be made without departing from the spirit or scope of this invention.

We claim:

1. A bevel gear holding fixture, comprising a support having angularly related coaxial annular locating surfaces, at least three locating elements, each having parts in predetermined spaced relation for engagement with said locating faces and between and against corresponding faces of adjacent teeth of a bevel gear in definite relation to the pitch cone of said gear, and means for rigidly and accurately spacing said elements angularly about the axis of said locating surfaces and in such engagement therewith.

2. A bevel gear holding fixture, comprising a support having angularly related coaxial annular locating surfaces, at least three locating elements, each having parts in predetermined spaced relation for engagement with said locating faces and between and against corresponding faces of adjacent teeth of a bevel gear in definite relation to the pitch cone of said gear, means for rigidly and accurately spacing said elements angularly about the axis of said locating surfaces and in such engagement therewith, and means for clamping the gear with certain of its teeth engaged with said elements.

3. A bevel gear holding fixture, comprising a support having angularly related coaxial annular locating surfaces, a plurality of disks each having surface portions shaped to engage between and against faces of the teeth of a bevel gear to be held and at a predetermined relation to the pitch cone of the gear, and arcuate spacers carried by said support between said disks and holding said disks spaced angularly about the axis of said surfaces with surface portions in engagement with said locating surfaces and surface portions with which the teeth of the gear may engage.

4. In combination, a support having angularly related coaxial locating surfaces, and means for supporting a bevel gear from said support with its pitch cone axis perpendicular thereto, said supporting means including a plurality of separate elements each engaging said locating surfaces and with which the teeth of a bevel gear may engage, and spacing elements between and engaging said separate elements and rigidly holding said separate elements angularly spaced about the axis thereof in definite relation to the pitch cone of said gear.

5. A bevel gear holding fixture comprising a support having a pair of angularly related coaxial locating surfaces, one of said surfaces lying in a plane perpendicular to said axis and the other of said surfaces being a cylindrical surface, at least three locating elements each having parts in predetermined spaced relation for engagement with said locating surfaces and between and against corresponding faces of adjacent teeth of a bevel gear in definite relation to the pitch cone of said gear, and means for rigidly and accurately spacing said elements angularly about the axis of the locating surfaces and in such engagement therewith.

6. A bevel gear holding fixture comprising a support having a pair of angularly related coaxial locating surfaces, one of said surfaces lying in a plane perpendicular to said axis and the other of said surfaces being a cylindrical surface, at least three locating elements each having parts in predetermined spaced relation for engagement with said locating surfaces and between and against corresponding faces of adjacent teeth of a bevel gear in definite relation to the pitch cone of said gear, means for rigidly and accurately spacing said elements angularly about the axis of the locating surfaces and in such engagement therewith, and means for clamping the gear with certain of its teeth engaging with said elements.

7. A bevel gear holding fixture, comprising a support having angularly related coaxial annular locating surfaces, a plurality of disks each having surface portions shaped to engage between and against faces of the teeth of a bevel gear to be held and at a predetermined relation to the pitch cone of the gear, arcuate spacers carried by said support between said disks and holding said disks spaced angularly about the axis of said surfaces with surface portions in engagement with said locating surfaces and surface portions with which the teeth of the gear may engage, and means for releasably clamping the gear in engagement with said disks.

8. A bevel gear holding fixture, comprising a support having angularly related coaxial annular locating surfaces, a plurality of disks each having surface portions shaped to engage between and against faces of the teeth of a bevel gear to be held and at a predetermined relation to the pitch cone of the gear, arcuate spacers carried by said support between said disks and holding said disks spaced angularly about the axis of said surfaces with surface portions in engagement with said locating surfaces and surface portions with which the teeth of the gear may engage, said disks having trunnions seated in mating sockets in said spacers.

9. A bevel gear holding fixture, comprising a support having angularly related coaxial annular locating surfaces, a plurality of disks each having surface portions shaped to engage between and against faces of the teeth of a bevel gear to be held and at a predetermined relation to the pitch cone of the gear, arcuate spacers carried by said support between said disks and holding said disks spaced angularly about the axis of said surfaces with surface portions in engagement with said locating surfaces and portions with which the teeth of the gear may engage, and a ring member carried by said support and engaging with said disks angularly spaced from the engagement of said disks with said locating surfaces but exposing portions of the disk surfaces for engagement with the teeth of the gear.

10. In combination with a cage having a pair of angularly related coaxial annular locating surfaces, at least three locating elements each having parts in predetermined spaced relation for engagement with said surfaces and between and against confronting faces of adjacent teeth of a bevel gear in definite relation to the pitch cone of said bevel gear, means for holding said elements to said cage in spaced angular relation, a holder having an opening therein, and means for clamping said cage within said opening in either endwise position.

11. In combination with a cage having a pair of angularly related coaxial annular locating surfaces, at least three locating elements each having parts in predetermined spaced relation for engagement with said surfaces and between and against confronting faces of adjacent teeth of a bevel gear in definite relation to the pitch cone of said bevel gear, means for holding said elements to said cage in spaced angular relation, a holder having an opening therein, abutments in line with said opening and against which one edge of said cage may engage, and means engaging another portion of said cage for clamping said cage in said opening.

BERNARD C. DAY.
MERTON H. ARMS.

REFERENCES CITED

The following references are of record in the file of this patent:

UNITED STATES PATENTS

| Number | Name | Date |
|---|---|---|
| 599,961 | Graham | Mar. 1, 1898 |
| 1,056,954 | Sponable | Mar. 25, 1913 |
| 1,110,396 | Marks | Sept. 15, 1914 |
| 1,561,843 | Garrison | Nov. 17, 1925 |
| 1,579,108 | Harter | Mar. 8, 1926 |
| 1,685,235 | Kempton et al. | Sept. 25, 1928 |
| 1,823,902 | Jellicoe | Sept. 22, 1931 |
| 1,961,663 | Goulder | June 5, 1934 |
| 2,354,816 | Klomp | Aug. 1, 1944 |